United States Patent
Jaeschke

[15] 3,672,042
[45] June 27, 1972

[54] METHOD OF MAKING POLE MEMBERS

[72] Inventor: Ralph L. Jaeschke, Kenosha, Wis.
[73] Assignee: Eaton Corporation, Cleveland, Ohio
[22] Filed: April 26, 1971
[21] Appl. No.: 137,378

[52] U.S. Cl. ............................29/602, 188/164, 192/12 D
[51] Int. Cl. .........................................................H01f 7/06
[58] Field of Search ....................29/596, 602, 607; 188/164; 192/12 D, 17 C, 18 B, 84 A, 3.56

[56] References Cited

UNITED STATES PATENTS

| | | | |
|---|---|---|---|
| 2,970,681 | 2/1961 | Timmcke | 188/164 X |
| 2,946,418 | 7/1960 | Leeson, Jr. | 192/12 D |
| 3,332,145 | 7/1967 | Klinkenberg | 29/607 |

Primary Examiner—John F. Campbell
Assistant Examiner—Carl E. Hall
Attorney—Teagno & Toddy

[57] ABSTRACT

The method of manufacturing pole members or rotors such as the type used in electromagnetic friction clutches and brakes. The pole member is manufactured from a stamped blank which is drawn into a suitable form. A plurality of support fingers are then formed and non-magnetically joined to form a hub. A portion of the hub is then removed forming an annular cavity in which an annular ring of friction material is installed. The hub may then be splined or keyed for mounting in the clutch or brake.

14 Claims, 10 Drawing Figures

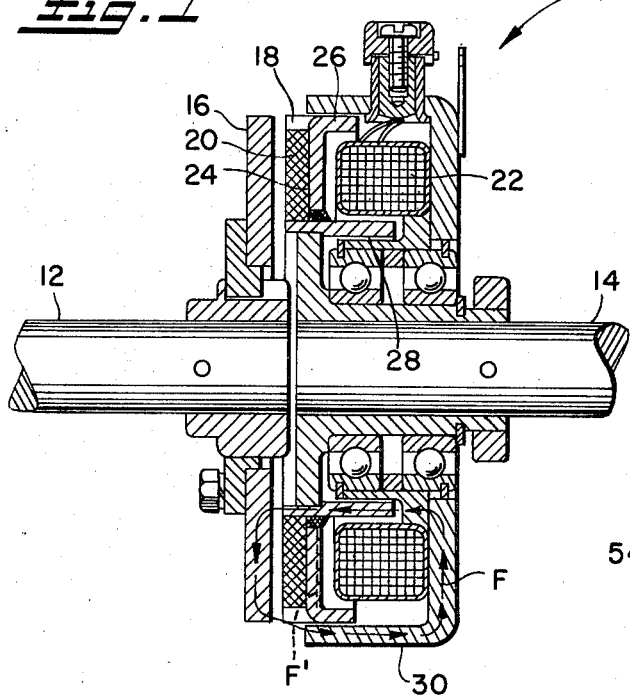
Fig. 1
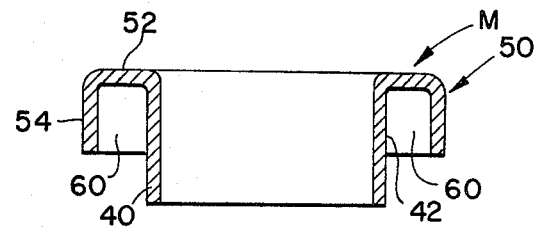
Fig. 2
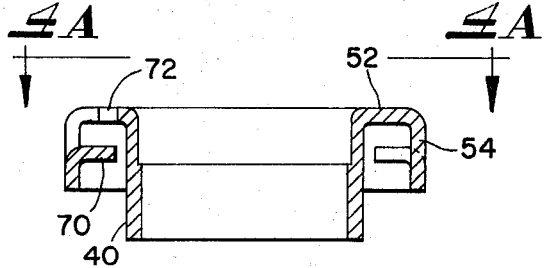
Fig. 3
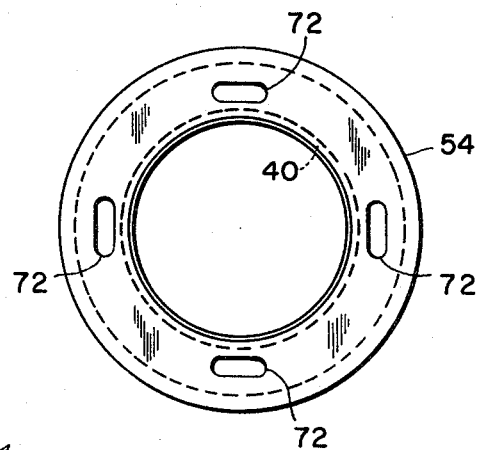
Fig. 4A
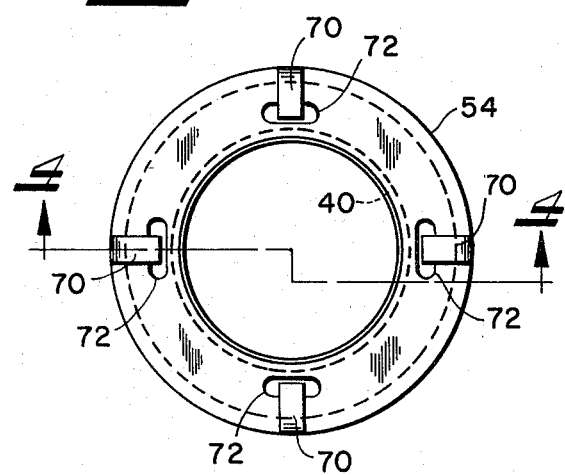
Fig. 4
Fig. 4B
INVENTOR.
RALPH L. JAESCHKE
BY
ATTORNEYS

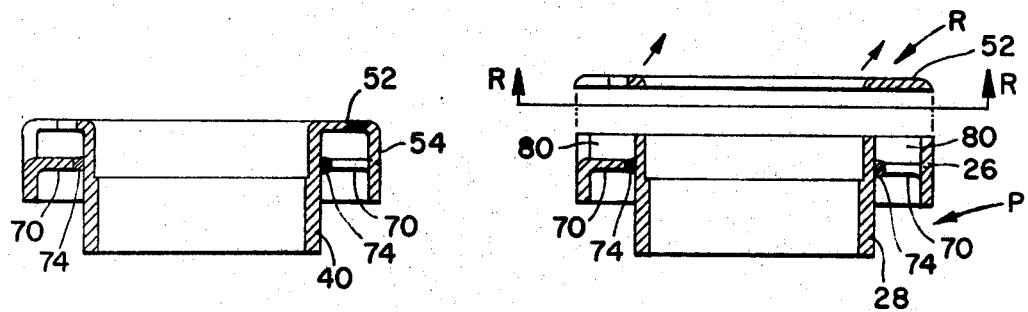
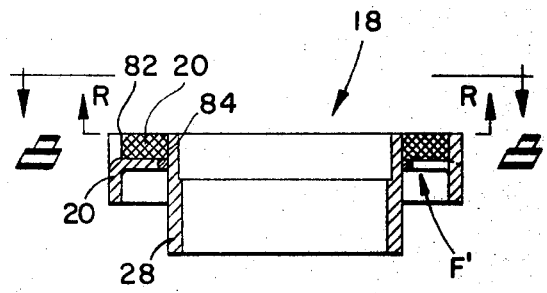
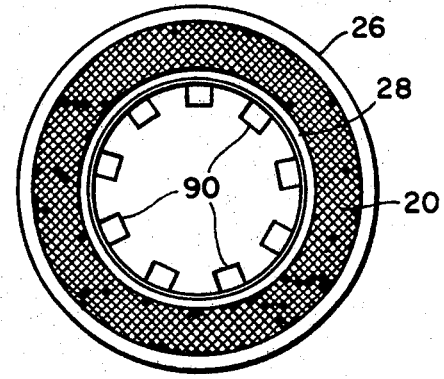

METHOD OF MAKING POLE MEMBERS

BACKGROUND OF THE INVENTION

1. Field of the Invention

This invention relates to the manufacture of pole members or rotors such as the type used in electromagnetic friction clutches and brakes and more particularly to the manufacture of pole members from stamped blanks.

2. Description of the Prior Art

Earlier methods of manufacturing pole members have involved the use of castings of forgings which were machined to final specifications. These methods have not been wholly satisfactory since castings and forgings are expensive and bulky and the required machining is both complicated and very costly. An additional disadvantage was the complicated machining and/or use of insulating material required to magnetically isolate the inner and outer pole members from each other.

SUMMARY OF THE INVENTION

In accordance with the present invention the disadvantages of the prior art methods have been overcome to the extent that pole members can be simply and inexpensively manufactured. This is accomplished by utilizing an inexpensive stamped blank which is formed into a member having a centrally located axially extending hollow hub with a flange on one end. The flange comprises a radially outwardly extending section and an axially extending portion at the outermost portion of the radial section. The axially extending section of the flange surrounds the hub in concentrically spaced telescopic relation thereto and forms a cross-sectionally U-shaped annular cavity therebetween. Fingers are then formed and non-magnetically joined between the legs of the U at position axially distant from the base of the U. The base of the U, or the radially extending portion of the flange, is then removed leaving two concentric hollow members, namely the hub, or inner member, and the axial portion of the flange, or outer member, which are rigidly attached and magnetically isolated by the fingers and form an annular U shaped cavity therebetween. The annular cavity is then supplied with friction material completing the manufacture of the pole member or rotor. An additional step may comprise splining or keying of the hub.

It is an object of this invention to provide a new and improved method of inexpensively manufacturing pole members.

It is a further object of this invention to provide a new and improved method of manufacturing pole members from stamped blanks.

Other objects and advantages of the invention will become apparent from the following detailed description taken in connection with the accompanying drawing.

BRIEF DESCRIPTION OF THE DRAWING

FIG. 1 is a sectional view of the pole member in its operational environment.

FIG. 2 is a top view of the stamped blank.

FIG. 3 is a sectional view of the member formed from the blank.

FIG. 4 is a sectional view of the formation of the fingers, taken along line 4—4 in FIG. 4b.

FIG. 4a is a top view of a modified method for formation of the fingers.

FIG. 4b is a top view of the formation of the fingers.

FIG. 5 is a sectional view of the non-magnetically joined fingers.

FIG. 6 is a sectional view of the member with the radially extending flange removed.

FIG. 7 is a sectional view of the completed pole member.

FIG. 8 is a top view of a modified method in which the inner member is splined.

DESCRIPTION OF THE PREFERRED EMBODIMENT

The pole member or rotor manufactured by the inventive method of the application is shown in its operational environment of an electromagnetic friction coupling such as clutch 10 in FIG. 1. It is understood that pole members produced by the invention are equally suited for uses in other couplings such as brakes and the like. The clutch 10 comprises axially aligned relatively rotatable shafts 12 and 14, one of which is the driving or power input shaft and the other is the driven or power output shaft. Splined to shaft 12 for axial movement relative thereto is armature plate 16. Attached to shaft 14 is the pole member 18 which is radially aligned and axial spaced from armature plate 16. Pole member 18 carries an annular ring of friction material 20. As is well known in the art, upon actuation of coil 22 a flux path shown as F will draw armature plate 16 into contact with the friction material 20 of pole member 18 which will effect a frictional driving connection between shafts 12 and 14. As is also well known in the art, finger 24 supporting outer axial portion 26 on inner axial portion 28 of pole member 18 must be magnetically non-conductive to avoid magnetic short circuits of flux path F. Clutch housing 30 may be mounted to a machine or the like. Suitable support bearings, not shown, for the shafts 12 and 14 are also provided in housing 30.

The method of manufacturing pole member 18 constitutes the invention of this application and will be described in detail below.

The blank B in FIG. 2, is a disk-like sheet metal stamping which may be blanked out of sheet or coil steel. The blank B may be of any sheet stock suitable for the manufacturing methods disclosed below and is of a thickness suitable for its application and suitable in relation to the diameter of the blank. If the blank B, or the sheet stock from which it is obtained, does not initially have the hardness and grain characteristics needed for the disclosed manufacturing methods it may be suitably treated as by annealing, heat-treating or other such steps which may be required to impart the required characteristics.

The blank B is then formed into the member M shown in FIG. 3. Member M is formed by means of a drawing operation which leaves the member M with a centrally located hollow axial hub 40 and a flange 50. The flange 50 has a radially outwardly extending section 52 and an axially extending section 54 which is concentric and spaced in telescopic relation with the exterior surface 42 of hub 40. The axial flange portion 54 and the hub 40 define a substantially annular U shaped cavity 60 therebetween.

The hub 40 and the axially extending section 54 of flange 50, later to become inner and outer portions 28 and 26 respectively as shown in FIGS. 1 and 7, are formed to suitable dimensions for mounting within clutch 10 and will require a minimum, if any machining.

A plurality of circumferentially spaced fingers 70 are then punched from the flange sections 52 and 54 to radially extend towards hub 40 from flange section 54 as shown in FIGS. 4 and 4b. The fingers are axially distant from radial flange section 52. The punching operation may be a two step process with oval shaped portions 72 or radial flange 52 blanked out prior to punching of fingers 70 (see FIG. 4a). This step assures that fingers 70 will extend towards but not touch hub 40. As will be discussed below, it is important that fingers 70 not touch hub 40 to avoid magnetic short circuiting of flux path F. After removal by blanking of oval shaped portions 72, the fingers are punched to extend from axial flange portion 54 radially inwardly towards hub 40 (see FIGS. 4 and 4b).

The fingers 70 are then rigidly non-magnetically joined to hub 40 exterior surface 42 at a point axially distant from radial flange section 52 as is seen in FIG. 5. The method of non-magnetic joining shown in FIG. 5 is a non-magnetic weld 74. However other suitable non-magnetic processes may be used such as brazing, bonding by epoxy and the like.

The upper portion R of the partially completed pole member shown in FIG. 6 above the line R–R is then removed. The upper portion R includes all of radial flange section 52 and possibly small portions of hub 40 and axial flange section 54. Upper portion R may be removed by any conventional method such as machining, grinding, stamping, sawing or the like. The remaining portion, member P in FIG. 6, consists of the centrally-located hollow inner portion 28 and the concentric telescopically spaced outer portion 26 which is non-magnetically joined to the inner portion 28 by fingers 70 and non-magnetic welds 74. The inner portion 28, outer portion 26, and fingers 70 define a substantially annular U shaped cavity 80 therebetween.

As is shown in FIG. 7, the member P is then fitted with an annular ring of friction material 20 which fits into cavity 80. The annular ring of friction material may be continuous or segmented and is fixed to the opposed sides of inner member 28 and outer member 26 by epoxy as at 82 and 84. The friction ring 80 will axially extend beyond line R—R for frictional engagement with armature plate 16 as is seen in FIG. 1.

As may be seen from FIG. 8, an additional step of broaching splines 90 to the interior surface of hub 40 may also be performed.

As has been noted above, it is an essential feature of the pole member or rotor 18 that the outer axial portion 26 and the inner axial portion 28 be magnetically isolated to prevent magnetic short circuits $F^1$ of flux path F. The present method provides a means for manufacturing a rotor from an inexpensive stamping that magnetically isolates the flux path without the complicated and expensive machining and/or insulating procedures required in the prior art methods.

Although the pole member manufacturing method of this invention has been illustrated and described herein to a somewhat detailed extent, it will be understood, of course, that the invention is not to be regarded as being correspondingly limited in scope but includes all changes and modifications within the terms of the claims hereof.

I claim:

1. A method of manufacturing pole members comprising the steps of:
   a. providing a disk-shaped sheet metal blank;
   b. forming said blank into a member having an axially extending centrally located hollow hub and a flange, said flange having a radially extending section extending from one end of the hub and an axially extending section concentric and spaced from said hub in telescopic relation thereto;
   c. forming a plurality of circumferentially spaced fingers extending radially towards said hub from said axially extending flange section and axially distant from said radially extending flange section;
   d. joining said fingers non-magnetically to said hub; and
   e. removing the radially extending flange section from said member to form a substantially U-shaped annular cavity between said hub and said axially extending flange section.

2. The method of claim 1 comprising the additional step of:
   f. installing an annular ring of friction material in said annular cavity.

3. The method of claim 2 comprising the additional step of:
   g. splining the interior surface of said hollow hub member.

4. The method of claim 1 wherein the providing of step "a" comprises stamping the blank from sheet metal.

5. The method of claim 1 wherein the forming of step "c" comprises blanking a portion of the radially extending flange section prior to formation of the fingers to assure the fingers will not touch said hub.

6. The method of claim 1 wherein the joining of step "d" comprises welding the fingers to the hub non-magnetically.

7. The method of claim 1 wherein the joining of step "d" comprises braising the fingers to the hub.

8. The method of claim 1 wherein the joining of step "d" comprises bonding the fingers to the hub.

9. The method of claim 1 wherein the removing of step "e" comprises grinding off the radially extending flange section.

10. The method of claim 1 wherein the removing of step "e" comprises blanking the radially extending flange section from the member.

11. The method of claim 1 wherein the removing of step "e" comprises sawing the radially flange section from the member.

12. The method of claim 1 wherein the removing of step "e" comprises machining the radially extending flange section from the member.

13. The method of claim 2 wherein the installing of step "f" comprises bonding the annular friction ring to the opposed surfaces of the hub and axially extending flange section.

14. The method of claim 3 wherein the splining of step "g" comprises broaching.

* * * * *